United States Patent [19]

Allen et al.

[11] Patent Number: 4,461,344

[45] Date of Patent: Jul. 24, 1984

[54] HEAT EXCHANGER

[76] Inventors: Greg Allen, 73 Woodville Ave., Toronto, Ontario, Canada, M4K 2J5; Wesley Swift, P.O. Box 4365, Station E, Ottawa, Ontario, Canada, K1S 5E4

[21] Appl. No.: 366,969

[22] Filed: Apr. 9, 1982

[30] Foreign Application Priority Data

Apr. 14, 1981 [CA] Canada ................................ 375398

[51] Int. Cl.³ .......................... F28B 9/08; F28F 3/12
[52] U.S. Cl. ..................................... 165/110; 165/165; 165/DIG. 12
[58] Field of Search ............... 165/DIG. 12, 166, 170, 165/165, 110

[56] References Cited

U.S. PATENT DOCUMENTS

| | | | |
|---|---|---|---|
| 2,601,973 | 7/1952 | Jensen | 165/166 |
| 3,363,681 | 1/1968 | Revilock et al. | 165/166 |
| 3,495,656 | 2/1970 | Dickson | 165/166 |
| 4,041,592 | 8/1977 | Kelm | 165/166 X |
| 4,401,155 | 8/1983 | Royal et al. | 165/166 |

*Primary Examiner*—Sheldon J. Richter

*Attorney, Agent, or Firm*—Rogers, Bereskin & Parr

[57] ABSTRACT

A heat exchanger for energy efficient ventilation of buildings is described. The heat exchanger has a core structure defined by a plurality of rectangular sheets of an extruded, cellular plastic material disposed in parallel, spaced-apart relationship. The cells of the sheets provide a first set of flow paths extending between ends of the core structure for use in passing cold fresh air. The spaces between the sheets are sealed at each end of the core structure, and a cellular plastic sealing material is wrapped about the sides, top and bottom of the core structure and apertured at opposite ends to access the spaces, so that the spaces between the sheets define a second set of flow paths for passing stale warm air. A drainage aperture is provided in an inner face of a bottom sheets of the sealing sheet, where condensation tends to accumulate. The drainage aperture permits condensation to escape through the cells of the bottom sheet. The heat exchanger also includes a housing that elevates one end of the core structure even when the housing is horizontally oriented to facilitate drainage, and that provides manifolds to access the flow paths.

9 Claims, 6 Drawing Figures

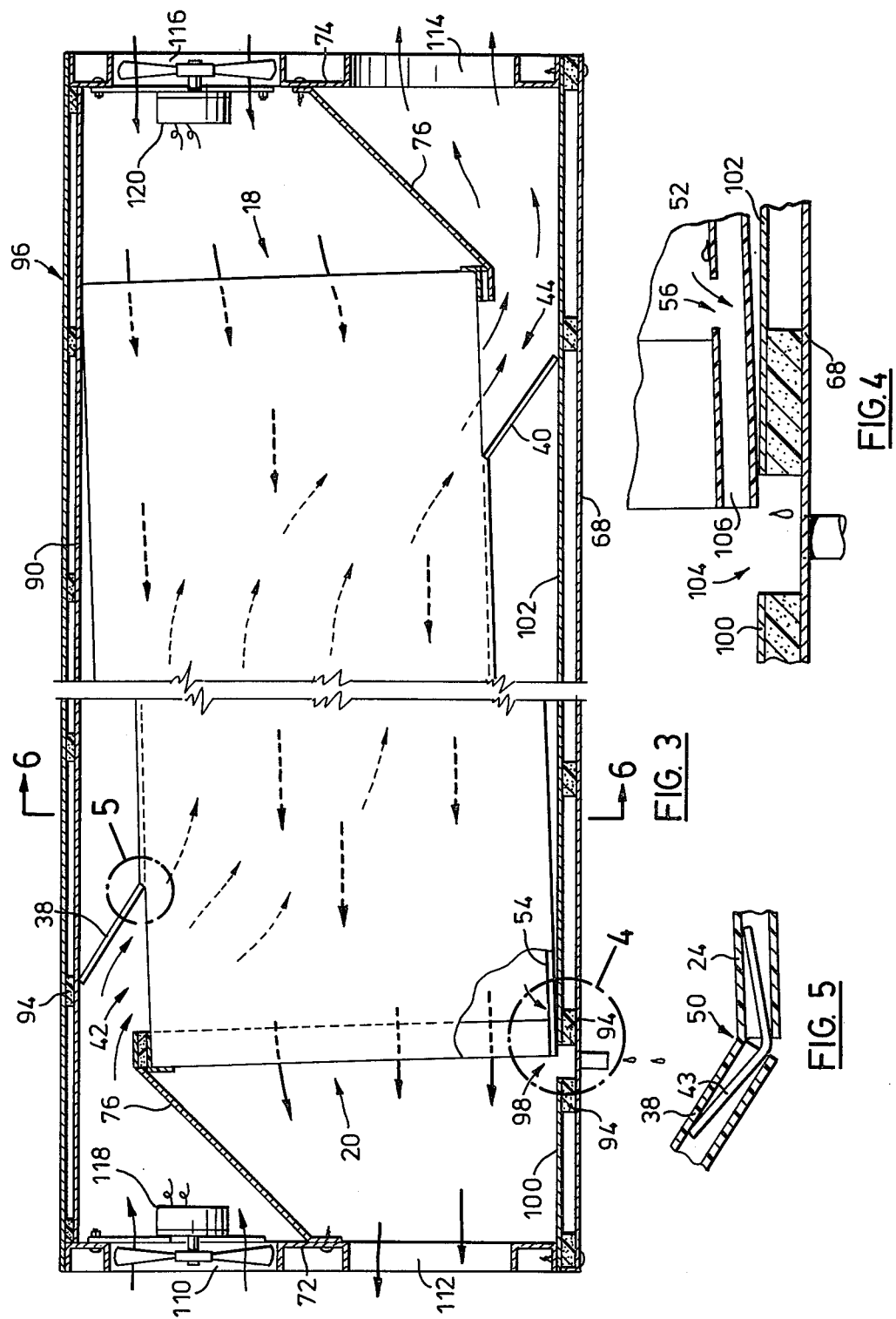

HEAT EXCHANGER

The invention relates to a heat exchanger for heat efficient ventilation of buildings and other substantially closed structures.

A heat exchanger embodying the invention is particularly useful for ventilating buildings of an air-tight construction intended to reduce heat loss through draft. Air enclosed in such buildings tends to become stale very quickly, and an energy efficient method of ventilating such buildings is desirable. In the past a number of heat exchangers intended for such ventilation have been proposed. These devices have a core structure in which stale and fresh air flows are separated by thin, heat transmitting walls that permit incoming fresh air to be heated by the stale air being exhausted. Significant reduction in heating costs can be achieved through the use of such devices.

A variety of air flow patterns have been used in heat exchangers with various degrees of heat exchange efficiency. Three types of flow patterns are typical in heat exchangers of relatively simple construction: a cross-flow in which the stale and fresh air flows are substantially transverse to one another; a parallel flow in which the air flows are directed in substantially the same direction; and a counter-flow in which the air flows are substantially parallel, but in opposite directions. Counter-flow devices have generally been considered most efficient in effecting heat exchange, all other factors such as materials of construction, heat exchange surface area, and the like, being equal.

Although counter-flow devices are desirable because of their relative efficiency, they tend to be particularly prone to accumulation of condensation and freeze-up, because of the low temperatures to which exhaust air may be cooled. This freeze-up of condensation tends to occur even when the heat exchanger is inclined to encourage drainage of condensation through a stale air exhaust port, and in practice can result in the blocking of the exhaust port. Furthermore, in a particular application it may be difficult to install a heat exchanger with its longitudinal axis inclined relative to the horizontal.

Accordingly, the invention seeks to provide a heat exchanger core incorporating a novel core structure and drainage arrangement, and a heat exchanger housing which serves to orient the heat exchanger core for proper drainage. The heat exchanger core comprises a core structure defined by a plurality of spaced-apart sheets of cellular material. The cells define a first set of flow paths which extend between ends of the core structure and which serve in operation to pass fresh cold air. The spaces between the individual sheets define a second set of flow paths used in practice to pass warm stale air. These spaces are sealed along the ends of the core structure, and an apertured cover is provided to control the passage of air through the spaces elsewhere. The cover has first and second openings which access the spaces between the sheets, the first opening being located adjacent to a first end of the core structure, and the second opening being located adjacent to a second end of the core structure. In the preferred embodiment of the core structure illustrated below stale air is circulated through the cover and the spaces between the sheets in a direction substantially parallel but opposite to that of incoming fresh air, namely, according to a substantially counter-flow pattern (although from the relative orientation of the openings of the cover it will be apparent that the flow pattern has some aspects of cross-flow).

Accumulation of condensation will generally not be a problem in the multiplicity of cells of each sheet of the core structure. The air flows in those cells will generally be fresh cool air flows that tend to be warmed in the heat exchanger core and consequently are unlikely to deposit condensation in the cells. However, condensation will tend to accumulate in the spaces between the sheets where warm humid air flows and will in practice be subject to a cooling. As a single space rather than multiplicity of cells) is defined between each pair of sheets and that space extends substantially the full length of the core structure, condensation will tend to flow unimpeded to the bottom of the spaces where it can then travel to the first end of the core structure. As the first end of the core structure will in practice be exposed to a warm environment, the tendency for freeze-up to occur is reduced.

Other objects and advantages of the invention will be apparent from a description of a preferred embodiment of the invention, considered together with the drawings in which:

FIG. 3 is a side elevation in section of the heat exchanger;

FIG. 4 is an enlarged view of the detail in circle 4 of FIG. 3;

FIG. 5 is an enlarged view of the detail in circle 5 of FIG. 3; and,

Figure 1:
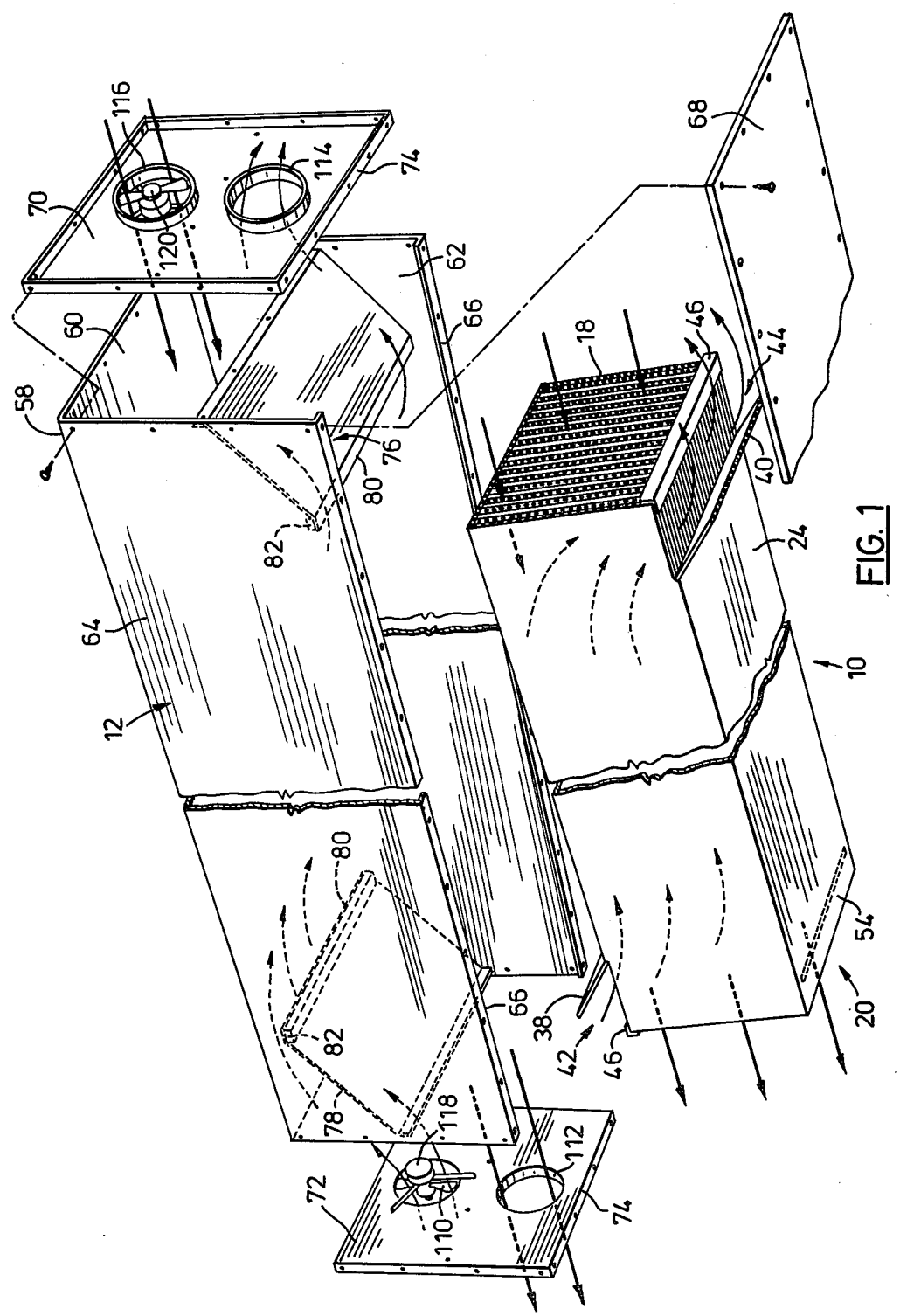
FIG. 1 is an exploded view of a heat exchanger embodying the invention.

FIG. 1 is an exploded perspective view illustrating a heat exchanger comprising a heat exchanger core 10, and a housing 12 constructed of galvanized steel sheet metal. The heat exchanger core 10 comprises a plurality of rectangular sheets (generally indicated by the reference numeral 14) formed from an extruded cellular polypropylene material. The sheets 14 are substantially plane parallel, and together define an elongate core structure with a generally rectangular cross-section which is apparent in the view of FIG. 6.

Figure 2:
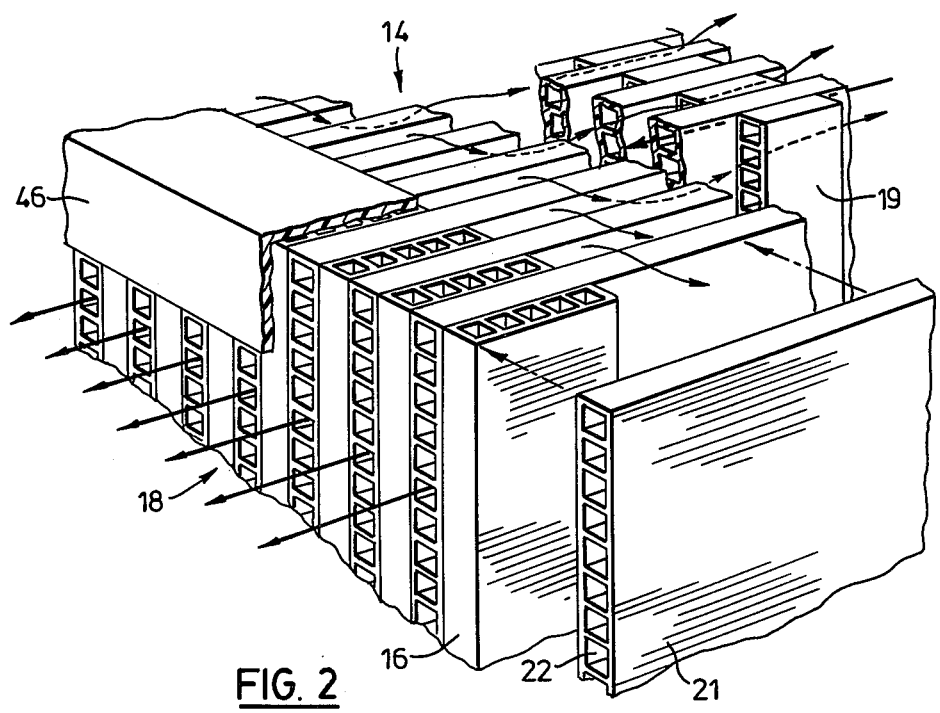
FIG. 2 is an enlarged view, partially fragmented and exploded, of the detail in circle 2 of FIG. 1.

Spacers 16 (only one being specifically indicated) in the view of FIG. 2 are formed of strips of the cellular polypropylene sandwiched between sheets 14 at the first end 18 of the core structure, and secured between paired sheets 14 as by heat welding. A side panel 21 (which serves as one side of the core structure) has been pulled away in the view of FIG. 2 to better illustrate one of the spacer strips 16. The spacer strips 16 serve also to seal the spaces between the sheets 14 along the first end 18 of the core structure. Similar spacer strips disposed at the second end 20 perform similar functions.

In part to ensure that the sheets 14 remain in substantially parallel spaced-apart relationship, spacers 19 (one-half inch strips of the cellular material) are provided mid-way along the length of the core structure between the sheets 14. The cells of the spacers 19 are disposed parallel to the general longitudinal axis of the core structure, that is, in the desired direction of warm air flow. The strips 19 consequently provide the simultaneous function of directing air flows longitudinally through the spaces between the sheets 14, and significantly affect the flow patterns occuring through the spaces (even though the spacers 19 are only one-half inches wide). The spacers 19 appear to distribute flows more evenly throughout the spacers, providing more effective use of the heat transmitting surface area of the sheets 14 and consequently providing greater efficiency in heat transfer.

The core structure 10 has two sets of air flow paths. The first set is defined by the cells 22 (only one being specifically indicated in the view of FIG. 2) of the sheets 14, which are substantially parallel and directed longitudinally between the first and second ends 20, 18 of the core structure. In use, the first set of flow paths are intended to carry cold fresh air received at the second end 18 of the core structure.

The second set of flow paths is provided by the spaces between the sheets 14. These spaces are sealed not only by the spacer strips 16 at either end 18, 20 of the core structure, but also by a cover sheet 24 wrapped about the top 26, bottom 28, and sides 30, 32 of the core structure. The cover sheet 24 is preferably constructed from a generally rectangular sheet of the cellular material used for the core structure bent to conform to the core structure and sealed with tape 34 along a longitudinal seam 36 (indicated in FIG. 6).

A first flap 38 is formed in the top of the cover sheet 24 adjacent to the end 20 of the core structure. A second substantially similar flap 40 is formed in the bottom of the cover sheet 24 adjacent to the end 18 of the core structure. The flaps 38,40 define openings 42,44 which access the spaces between the sheets 14. To reinforce the core structure where the flaps 38, 40 are formed angled plastic members 46 are heat welded to the sheets 14 as illustrated.

A very simple mechanism is employed to ensure that the flaps 38, 40 are biased in the open position illustrated throughout the drawings. This mechanism is specifically illustrated in the view of FIG. 5 which is an enlarged, sectional view of the detail of portions of the flap 38 and cover sheet 24. A short length of wire 48 (which can even be of the flexible multi-stranded variety) is insinuated between adjacent cells of the wrapper 24 at the hinge 50 formed at the base of the flap 38. Because of the resilience of the polyethylene defining the walls of the cells, the flap 38 is effectively spring-biased in the open position illustrated.

Provision is made for the drainage of condensate (formed in the spaces between the sheets 14 in normal operation) through a bottom sheet 52 defined by the cover sheet 24. A rectangular strip is removed from the inner face 54 of the bottom sheet 52 immediately adjacent to the end 20 of the core structure to define a drainage aperture 56(illustrated in ghost outline in FIG. 1). The drainage aperture 56 accesses the cells of the bottom sheet 52, and because these cells are longitudinal directed between, and open at, the ends 18, 20 of the core structure, condensation passing through the drainage aperture 56 tends to escape through the cells on the bottom sheet 52 when the end 18 is elevated relative to the end 20. As the end 20 of the core structure will generally be exposed to warm temperatures during contemplated operation freeze-up problems will tend to be avoided. Alternatively, drainage apertures could be provided in the end 20 of the core structure, just above the bottom sheet 52.

The core structure as described must be inclined to encourage drainage of condensation. However, the core structure and its covering means can be constructed with an inclined bottom cover sheet (for example, a false bottom so that drainage occurs even when the core structure and covering means rest on a level surface. The core structure as illustrated is preferred, however, for ease of construction.

The directions of air flow as contemplated in the core 10 are illustrated in the views of FIGS. 1–3. Stale warm air is received at the opening 42, travels the length of the core structure, and leaves through the opening 44. Cold fresh air is received at the end 18, travels through the cells 22 of the sheets 14, and escapes through the end 20. The flow pattern is substantially of the counter-flow type, with certain aspects of cross-flow as the openings 42, 44 are disposed in the top and bottom of the core 10. However, where the length of the core 10 substantially exceeds its width, the flow pattern will be characteristic of counter-flow.

The housing 12 includes a body portion 58 of generally U-shaped cross-section defined by a top panel 60 and side walls 62, 64. The side walls 62, 64 are formed with longitudinal connecting flanges 66 for use in securing a bottom panel 68 of generally rectangular shape to the body portion 58. Generally rectangular end panels 70, 72 formed with peripheral reinforcing and connecting flanges 74 are also provided. The various components of the housing 12 are secured to one another by means of screws, and the proper manner of assembly will be apparent from FIG. 3 which illustrates an assembled heat exchanger.

Baffles 76, 78 are provided for use in properly locating the heat exchanger core 10 in the housing 12 and also to define manifolds for directing air flows through the cord 10. The baffles 76, 78 are constructed of galvanized sheet metal, and are rigidly secured by rivets or screws to the sidewalls 62, 64 of the housing 12. The baffles 76, 78 are substantially parallel to one another, and disposed at an angle of about 45 degrees at the top panel 60. Each of the baffles 76, 78 is formed with a lip 80 for use in orienting the heat exchanger core 10 in the housing 12. Strips 82 of a compressible foam polyurethene are disposed between the lips 80 and the reinforcing angle members 46 so that the core 10 is securely retained by the baffles 76,78, and the effect of this arrangement is to incline the heat exchanger core 10 at an angle of about 3-5 degrees relative to the bottom panel 68 (when the heat exchanger is assembled as in FIG. 3).

Figure 6:
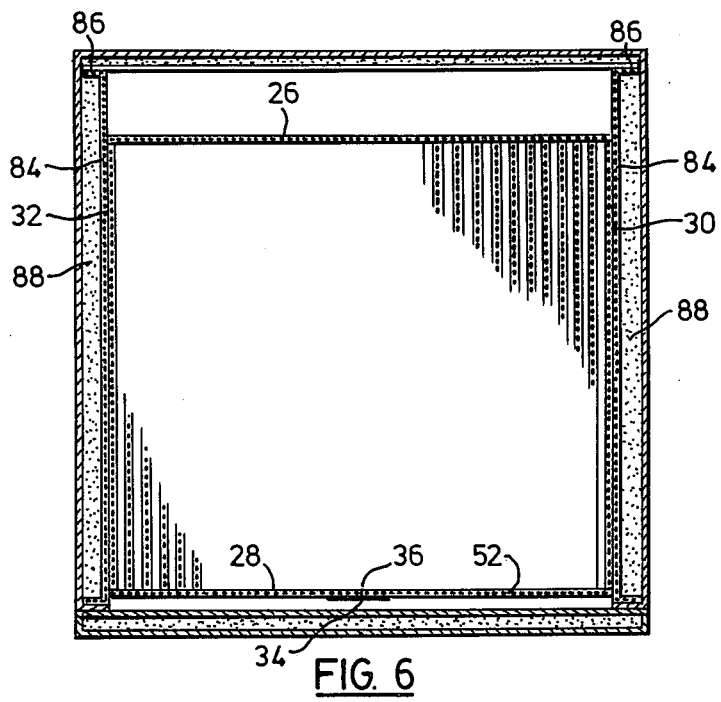
FIG. 6 is a sectional view along the lines 6—6 of FIG. 3.

Provisions are made to prevent leakage of air around the heat exchanger core 10 in the housing 12. In the view of FIG. 6 are illustrated two side panels 84 which run substantially the full length of the inner surfaces of the housing sidewalls 62, 64. Each of these panels 84 is constructed of the same cellular material of which the heat exchanger core 10 is constructed, and each is formed with oppositely-disposed flanges 86. The side panels 84 are biased inwardly by compressible, foam polyurethene spacers 88 (formed as strips placed periodically along the length of the housing 12) to engage the sides 30, 32 of the heat exchanger core cover sheet 24. Top and bottom panels 90, 92 are biased by similar spacers 94 to engage the core cover sheet 24 at 96, 98, and the top panel 90 is also biased against the upper flanges 86 of the side panels 84. In this manner the flow of air around the heat exchanger core 10 within the housing 12 is prevented.

The bottom panel 92 is constructed in two parts 100, 102 separated to define a trough 104 which is best illustrated in the enlarged view of FIG. 4. Water condensating in the spaces between the sheets 14 escapes through the drainage aperture 56, into the cells of the bottom sheet 52, and escapes through openings 106 into the trough 104. A drainage duct 108 of generally rectangular shape provided across the bottom panel 68 permits the condensate to escape from the trough 104. The spacers 94 defining the trough should be coated or formed with a water resistant surface.

Air flows in and out of the housing 12 are directed through the ends panels 70, 72. The end panel 72 is formed with an apertured circular collar which defines a stale air inlet duct 110, and with a second similar collar which defines a fresh air exhaust duct 112. The end panel 74 is also formed into similar collars, one collar defining a fresh air inlet duct 116, and the other collar defining a stale air exhaust duct 114. (Each duct has been labelled accordingly to whether its air flow is in or out relative to the interior of the housing 12). An electric fan 118 mounted in the collar 110 draws stale air into the housing 12, and an electric fan 120 draws fresh air into the housing 12. Flaps 38, 40 biased to engage the panels 90, 92 serve as baffles for use in deflecting the air flows created by the fans 118, 120.

The heat exchanger is installed with the housing 12 horizontally oriented (the heat exchanger core 10 then being properly inclined for drainage). The end 20 of the heat exchanger core is disposed within or towards the heated environment (from which stale air must be exhausted), and the end 18 is located in or towards the external environment where cold fresh air is to be obtained. The fans 118, 120 are then operated to exhaust stale air and replace it with fresh air at some prescribed rate. Air flow through the heat exchanger core 10 and housing 12 is essentially as follows. Cold air is drawn by the fan 120 into the housing 12, is deflected by baffle 76 towards the heat exchanger end 18, is forced through the cells 22 of the sheets 14 to escape from the end 20 of the heat exchanger core 10, and then is deflected by the baffle 76 out the fresh air exhaust duct 112. Warm stale air is drawn by the fan 118 into the housing 12, is deflected by the baffle 78 and the flap 38 into the opening 42 accessing the spaces between the sheets 14, travels the length of the heat exchanger core 10 leaving the core 10 through the opening 44, and is then deflected by the baffle 76 out the stale air exhaust duct 116. In the process, the cold fresh air is warmed, and the stale air is cooled before being exhausted.

During operation of the heat exchanger as described above warm stale air in the air spaces between the sheets 14 is cooled causing water vapor to condense and accumulate at the bottom of the heat exchanger core 10. The manner in which the condensation is removed from the heat exchanger core 10 and the housing 12 is described in detail above, and in particular it should be noted that the condensation escaping through the trough 104 and drainage duct 108 will escape in practice into a warm environment, and will tend not to be subject to freeze-up. Some leakage of stale air through the drainage aperture 56 back into the heated environment is inevitable; but in practice this should not significantly affect the operation of the heat exchanger.

Even with the novel drainage arrangement of the heat exchanger there is a possibility of freeze-up. Consequently, it is contemplated that operation of the heat exchanger will be regulated in part by a temperature sensor (not illustrated) disposed in the housing 12 at the fresh air exhaust duct 112 to detect the temperature of the warmed fresh air being introduced into the heat environment. When the temperature of the air flow through the duct 112 drops below some predetermined level (which will depend in part on the temperature of the environment in which the heat exchanger is functioning) indicating that the flow of warm stale air has been blocked by freeze-up, the temperature sensor actuates a switch (not illustrated) which discontinues operation of the fan 120. With the incoming cold air flow discontinued and the warm air flow maintained, the heat exchanger begins to defrost. Operation of the fan 120 is then resumed when the temperature detected by the temperature sensor exceeds another predetermined level. It will be apparent that when the operation of the fan 120 is regulated in this manner the heat exchanger may go through the defrost cycle described several times before resuming continuous operation. A more elaborate method of defrosting the heat exchanger might be developed, however, the arrangement just described is satisfactory and relatively simple. Additionally, the operation of both fans 118,120 may be regulated by a humidity sensor exposed to the warm environment in which the heat exchanger is operating and indicative of the staleness of the air in this environment. The operation of both fans 118, 120 would be discontinued when the humidity drops below some predetermined level, and then resumed when the humidity level is once again exceeded (perhaps by some predetermined differential amount).

A particular embodiment of a heat exchanger including a special heat exchanger core and housing has been described. It will be appreciated that variations of workshop nature may be made in the various elements of the heat exchanger illustrated without departing from the scope or spirit of the invention.

We claim:
1. A heat exchanger core, comprising:
a core structure defined by a plurality of spaced-apart sheets of cellular material, each of which has first and second oppositely-disposed end edges and first and second oppositely-disposed side edges the core structure having a first end defined collectively by the first end edges, a second end defined collectively by the second end edges, a first side defined by one of the sheets, a second side defined by another one of the sheets, a top defined collectively by the first side edges, and a bottom defined collectively by the second side edges, and the cells of the sheets defining flow paths, open at the first and second ends of the core structure, for directing gas flows between the first and second ends of the core structure;
spacing means for keeping the sheets spaced apart so that a space extending between the first and second ends of the core structure is defined between each pair of sheets;
sealing means for sealing each of the spaces defined between the sheets along the first and second ends of the core structure;
cover means for covering the top and bottom of the core structure to prevent the movement of gases through the top and bottom of the core structure and between the spaces, including a first aperture located in the cover means adjacent to the first end of the core structure and accessing the spaces between the sheets, and a second aperture located in the cover means adjacent to the second end of the core structure and accessing the spaces between the sheets, whereby, heat can be exchanged between a warm gas flow directed from the first aperture through the spaces between the sheets and out the second aperture, and a cold gas flow di- rected from the second end of the core sturcture to the first end of the core structure through the cells of the sheets; and, drainage aperture means located adjacent to the first end of the core structure for use in draining condensation accumulating at the bottom of the core structure in the spaces between the sheets.

2. A heat exchanger core as claimed in claim 1 in which the cover means include a cover sheet of cellular material having an inner face covering the bottom of the core structure, an outer face and a plurality of cells defined between the inner and outer faces and apertured adjacent to the first end of the core structure, and in which the drainage aperture means comprise a drainage aperture located in the inner face of the cover sheet adjacent to the first end of the core structure and accessing at least some of the cells of the cover sheet whereby when the bottom of the second end of the core structure is elevated relative to the bottom of the first end of the core structure any liquid accumulated in the spaces between the sheets tends to escape through the drainage aperture into the cells of the cover sheet and out of the apertures in the cells of the cover sheet.

3. A heat exchanger core as claimed in claim 1 including elongate spacer strips of cellular material secured between adjacent pairs of sheets of the core structure, the length of each strip extending generally from the top to the bottom of the core structure with a space between the bottom of the core structure and each strip to permit passage of condensation along the bottom of the core structure, and the cells of the strips being substantially straight and parallel to a longitudinal axis extending through the core structure between the first and second ends, whereby gas flows in the spaces between the sheets tends to be directed by the spacers.

4. A heat exchanger core as claimed in claim 1, 2 or 3 in which the sheets of the core structure are substantially parallel to one another, and in which the cells of the sheets are substantially straight and parallel to one another.

5. A heat exchanger as claimed in claim 1, 2 or 3 in which the first aperture is located in the cover means at the top of the core structure and the second aperture is located in the cover means at the bottom of the core structure.

6. A heat exchanger comprising a heat exchanger core and housing, in which:

the heat exchanger core comprises a core structure defined by a plurality of spaced-apart sheets of cellular material, each of which has first and second oppositely-disposed side edges the core structure having a first end defined collectively by the first end edges, a second end defined collectively by the second end edges, a first side defined by one of the sheets, a second side defined by another one of the sheets, a top defined collectively by the first side edges, and a bottom defined collectively by the second side edges, and the cells of the sheets defining flow paths, open at the first and second ends of the core structure for directing gas flows between the first and second ends of the core structure;

the heat exchanger core comprises spacing means for keeping the sheets spaced apart so that a space extending between the first and second ends of the core structure is defined between each pair of sheets;

the heat exchanger core comprises sealing means for sealing each of the spaces defined between the sheets along the first and second ends of the core structure;

the heat exchanger core comprises cover means for covering the top and bottom of the core structure to prevent the movement of gases through the top and bottom of the core structure and between the spaces, including a first aperture located in the cover means adjacent to the first end of the core structure and accessing the spaces between the sheets, and a second aperture located in the cover means adjacent to the second end of the core structure and accessing the spaces between the sheets, whereby, heat can be exchanged between a warm gas flow directed from the first aperture through the spaces between the sheets and out the second aperture, and a cold gas flow directed from the second end of the core structure to the first end of the core structure through the cells of the sheets;

the heat exchanger core comprises drainage aperture means located adjacent at the first end of the structure for use in draining condensation accumualting at the bottom of the core structure in the spaces;

the housing comprises a hollow casing with a top, a bottom, oppositely-disposed sides, and first and second oppositely-disposed ends, each of the first and second ends of the housing having first and second apertures;

the housing comprises means for maintaining the heat exchanger core in a predetermined position within the housing that permits drainage of condensation from the first end of the core structure in use;

the housing comprises drainage means located in the bottom of the housing adjacent to the first end of the housing for draining from the housing condensation escaping from the first end of the heat exchanger core;

the housing comprises flow sealing means extending between inner surfaces of the housing and the heat exchanger core for preventing any substantial flow of gases between the ends of the housing except through the heat exchanger core;

the housing comprises first baffle means for directing gas flows entering the first aperture of the first end of the housing into the first aperture of the cover means of the heat exchanger core and for directing gas flows leaving the cells of the sheets of the heat exchanger core at the first through the second aperture in the second end of the housing; and, the housing comprises second baffle means for directing gas flows entering the first aperture of the second end of the housing into the cells of the sheets of the heat exchanger core and for directing gas flows leaving the second aperture of the cover means of the heat exchanger core out the second aperture in the second end of the housing.

7. A heat exchanger as claimed in claim 6 in which each of the heat exchanger core and housing is shaped generally like an elongate rectangular prism, and the predetermined position of the heat exchanger core is such that the second end of the core structure is elevated relative to the first end of the core structure when the housing is horizontally disposed.

8. A heat exchanger as claimed in claim 7 in which the first and second apertures of the cover means are located respectively adjacent the top and bottom of the core sturcture, the first baffle means comprise a first baffle extending substantially from between the first and second apertures of the first end of the housing to the edge defined between the first end and top of the core structure, and the second baffle means comprise a second baffle extending substnatially from between first and second apertures of the second end of the housing to the edge defined between the second end of the core sturcture and the bottom of the core structure.

9. A heat exchanger as claimed in claim 6 in which the flow sealing means comprises at least one sheet of material biased by a compressible, gasket disposed between the sheet and an interior surface of the housing to engage the heat exchanger core, thereby, providing a seal between the interior surface and the heat exchanger core.

* * * * *